April 26, 1932.   I. B. MOORE ET AL   1,855,253

BUMPER

Filed March 17, 1931

Inventors:
Irving B. Moore,
John R. Sibley.

by Walter E. Lombard,
Atty.

Patented Apr. 26, 1932

1,855,253

UNITED STATES PATENT OFFICE

IRVING B. MOORE, OF WATERTOWN, AND JOHN R. SIBLEY, OF WEST ROXBURY, MASSACHUSETTS

BUMPER

Application filed March 17, 1931. Serial No. 523,240.

This invention relates to bumpers for motor vehicles and has for its object the production of a device of this character which will be capable of withstanding severe shocks and subsequently return the various elements thereof to their normal position.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings.

Similar characters indicate like parts throughout the several figures of the drawings.

Figure 1:
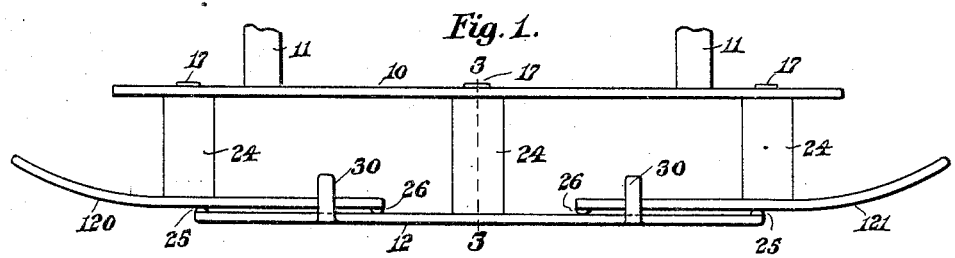
Figure 1 represents a plan of a bumper embodying the principles of the present invention.
Figure 2:
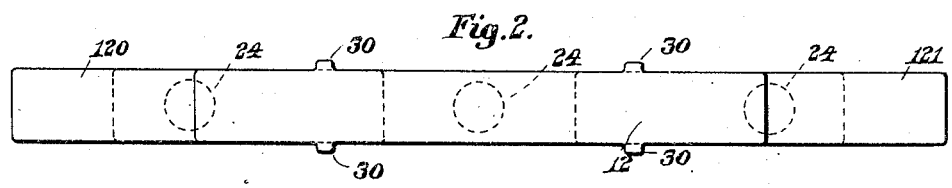
Figure 2 represents a front elevation of same.
Figure 3:
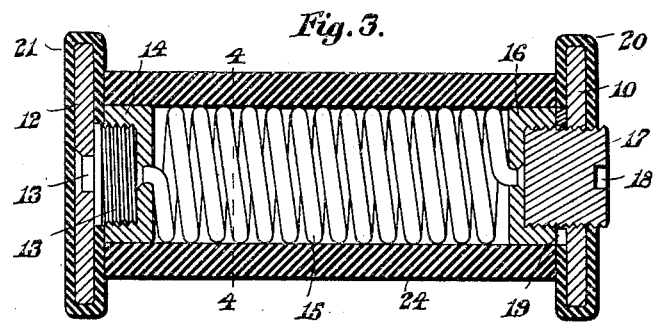
Figure 3 represents an enlarged section on line 3, 3, on Fig. 1.
Figure 4:
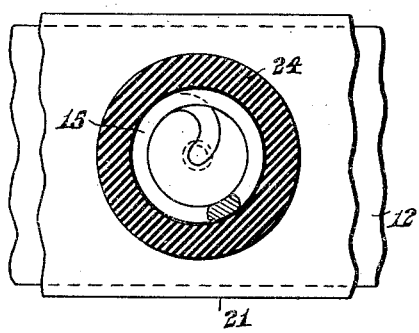
Figure 4 represents a transverse section on line 4, 4, on Fig. 3.
Figure 5:
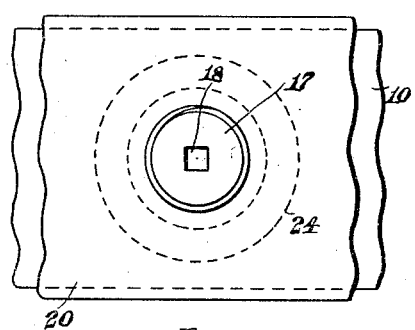
Figure 5 represents a rear elevation of a portion of the bumper.

In the drawings, 10 is a straight flat bar secured to the vehicle by members 11.

In front of the bar 10 and spaced therefrom are a pluarilty of overlapping bars 12, 120 and 121.

Each front bar 12, 120 and 121 has projecting from the rear face thereof a plurality of threaded projections 13 which may be formed integral with said bar or riveted thereto as shown at 13x.

Each projection 13 is adapted to enter and be secured to a cup-shaped member 14 having secured thereto one end of a helical spring 15.

The opposite end of each spring 15 is secured to another cup-shaped member 16.

The bar 10 has a plurality of threaded openings therein each to receive a screw plug 17, the forward end of which is adapted to enter and be threaded to one of the cup-shaped members 16.

Each screw plug 17 is provided with a depression 18 therein by which said plug may be rotated.

Between the bar 10 and each cup-shaped member 16 is a split washer 19 which is adapted to prevent accidental rotation of the plug 17.

It will be noted that the cup-shaped members 14 and 16 are permanently secured to the opposite ends of the helical spring 15.

All of the bars 10, 12, 120 and 121 have coverings of rubber 20, 21 and these coverings may be of any color to harmonize with the color of the vehicle itself.

Interposed between the bars 10 and 12 and surrounding each pair of cup-shaped members 14, 16 and the connecting helical spring 15, is a tubular member 24 of the resilient material such as rubber, preferably colored like the coverings 20, 21.

In assembling the various elements of the bumper, the cup-shaped members 14 are threaded to the projections 13.

The tubular members 24 are then placed over the cup-shaped members 14, 16 and spring 15.

With these elements thus installed, the front bars 12, 120, 121, with the other elements secured thereto are then placed in position adjacent the bar 10 and the screw plugs 17 are threaded to the several cup-shaped members 16.

The rubber coverings to the bars 10, 12, 120 and 121 and particularly the covering of the bars 12, 120 and 121 will prevent the marring of a vehicle when coming into contact therewith.

Should the impact be considerable the spring 15 will be compressed and likewise the rubber tubes 24, thus preventing injury to the vehicle itself.

These interposed resilient members 15, 24, are capable of moving sidewise to some extent when the bumper is hit at an angle and will return to their normal positions as soon as the vehicles are separated.

While the resilient connections 15, 24, as shown and described may be used to advantage in the present form of bumper, it is obvious that other resilient members may be used to connect the bars 12, 120 and 121 to the bar 10.

The bar 12 is supported by the central resilient member 15, 24, while the bars 120 and 121 are supported by the outer resilient members.

The bar 12 has at the ends thereof projections 25 which bear against the outer faces of the bars 120, 121 opposite the outer resilient members 15, 24 and the inner ends of these bars 120, 121 have projections 26 which bear against the rear face of the bar 12.

The rubber covers 21 of these bars 12, 120, 121 prevent these elements from rattling when the vehicle is travelling over the road.

This feature of having the bars 12, 120 and 121 overlapping and each secured to a separate resilient member 15, 24 constitutes the present invention.

By forming the front of the bumper in this manner results are obtained which could not be obtained in any other manner.

For instance, if the bumper is hit in the center thereof the shock will be sustained by all of the resilient members which will be equally compressed.

If the bumper is hit at the outer end of either of the outer bars 120, 121, the shock will be sustained not only by its supporting resilient member but as this resilient member is bent sidewise the outer bar will move into an angular position causing the projections 26 to force one end of the bar 12 outwardly and the other end inwardly against the other outer resilient member.

By doing this the shock is sustained by all of the resilient members 15, 24, the bars 12, 120 and 121, acting as a series of levers.

As a consequence by extending the resistance to the shock to a plurality of shock sustaining elements, no one of these elements will take all of the shock and there is less liability of doing permanent injury to the bumper.

Owing to these bars 12, 120 and 121 acting as a series of levers the shock will be sustained by all of the resilient members regardless of which bar receives the initial shock.

Even if a car passing in the same direction should strike the rear of one of the outer bars 120, 121 and should move it at an angle about its center it would cause an end of the bar 12 to be moved outwardly and the opposite end thereof to be moved inwardly so that a resilient member at that point will sustain part of the shock.

If the bumpers of two vehicles become locked together they may be disengaged readily owing to the resiliency of the members 15, 24, as these members may be bent downwardly or upwardly until free from the bumper of the other car.

The bars 12, 120 and 121 are disconnected from each other and may move independently of each other about their fulcrums which in each case is the connection of said bar to one of the resilient members 15, 24.

Preferably the bar 12 has rearward extensions 30 between which the inner ends of the bars 120, 121 are disposed, thus retaining said bars in alinement at all times.

Having thus described our invention, we claim:

1. In a vehicle bumper, a supported bar; resilient members projecting from the front face thereof; and a plurality of bars each supported on the forward end of one of said resilient members with adjacent ends of said bars overlapping.

2. In a vehicle bumper, a supported bar; resilient members projecting from the front face thereof; and a plurality of bars each supported on the forward end of one of said resilient members with the inner ends of the outer bars overlapping the rear face of the center bar.

3. In a vehicle bumper, a supported bar; resilient members projecting from the front face thereof; and a plurality of bars each supported on the forward end of one of said resilient members with the inner ends of the outer bars overlapping the rear face of the center bar and provided at their extremities with projections bearing against said center bar.

4. In a vehicle bumper, a supported bar; resilient members projecting from the front face thereof; a bar secured to the front end of each resilient member, the center bar having its ends overlapping the outer bars and contacting therewith opposite the outer resilient members.

5. In a vehicle bumper, a supported bar; members projecting from the front face thereof; and a plurality of bars each supported on the forward end of one of said members with adjacent ends of said bars overlapping.

6. In a vehicle bumper, a supported bar; members projecting from the front face thereof; and a plurality of bars each supported on the forward end of one of said members with the inner ends of the outer bars overlapping the rear face of the center bar.

7. In a vehicle bumper, a supported bar; members projecting from the front face thereof; and a plurality of bars each supported on the forward end of one of said members with the inner ends of the outer bars overlapping the rear face of the center bar and provided at their extremities with projections bearing against said center bar.

8. In a vehicle bumper, a supported bar; resilient members projecting from the front face thereof; a bar secured to the front end of each resilient member, the center bar having its ends overlapping the outer bars and provided at its extremities with rearward extending projections contacting therewith opposite the outer resilient members.

9. In a vehicle bumper, a supported bar; and a plurality of overlapping bars disconnected from each other and pivotally connected to said supported bar at points intermediate their ends.

10. In a vehicle bumper, a supported bar; resilient members secured to the front face thereof; and a bar secured intermediate its ends to the forward end of each extension, said bars overlapping and being disconnected from each other.

11. In a vehicle bumper, a supported bar; a plurality of overlapping bars disconnected from each other and pivotally connected to said supported bar at points intermediate their ends; and means for retaining said bars in alinement.

12. In a vehicle bumper, a supported bar; a plurality of overlapping bars disconnected from each other and pivotally connected to said supported bar at points intermediate their ends; and parallel extensions on the center bar between which the inner ends of the outer bars are disposed.

13. In a vehicle bumper, a supported bar; and a plurality of overlapping bars supported thereby, said bars being disconnected from each other and each adapted to be moved into an angular position with a free end thereof in contact with a free end of an adjacent bar.

Signed by us at 294 Washington St., Boston, Massachusetts, this 14th day of March, 1931.

IRVING B. MOORE.
JOHN R. SIBLEY